(12) United States Patent
Matsumoto

(10) Patent No.: US 12,018,719 B2
(45) Date of Patent: Jun. 25, 2024

(54) SLIDING MEMBER

(71) Applicant: TAIHO KOGYO CO., LTD., Toyota (JP)

(72) Inventor: Shinji Matsumoto, Miyoshi (JP)

(73) Assignee: TAIHO KOGYO CO., LTD., Toyota (JP)

(*) Notice: Subject to any disclaimer, the term of this patent is extended or adjusted under 35 U.S.C. 154(b) by 0 days.

(21) Appl. No.: 17/311,413

(22) PCT Filed: Aug. 29, 2019

(86) PCT No.: PCT/JP2019/033900
§ 371 (c)(1),
(2) Date: Jun. 7, 2021

(87) PCT Pub. No.: WO2020/129316
PCT Pub. Date: Jun. 25, 2020

(65) Prior Publication Data
US 2022/0025928 A1    Jan. 27, 2022

(30) Foreign Application Priority Data
Dec. 17, 2018 (JP) ................. 2018-235147

(51) Int. Cl.
*F16C 33/10* (2006.01)
*C10M 103/06* (2006.01)
(Continued)

(52) U.S. Cl.
CPC ........... *F16C 33/10* (2013.01); *C10M 103/06* (2013.01); *C10M 107/44* (2013.01);
(Continued)

(58) Field of Classification Search
CPC ......... F16C 33/10; F16C 9/02; C10M 103/06; C10M 107/44; C10M 111/04;
(Continued)

(56) References Cited

U.S. PATENT DOCUMENTS 4,847,135 A     7/1989  Braus et al.
6,827,996 B2 *  12/2004 Goto ..................... F16L 15/001
                                                  285/94

(Continued)

FOREIGN PATENT DOCUMENTS

CN         1037480 A     11/1989
CN       101267897 A      9/2008
(Continued)

OTHER PUBLICATIONS

International Search Report of PCT/JP2019/033900 dated Nov. 12, 2019 [PCT/ISA/210].
(Continued)

*Primary Examiner* — Taiwo Oladapo
(74) *Attorney, Agent, or Firm* — Sughrue Mion, PLLC

(57) ABSTRACT

Provided is a technique capable of exhibiting high seizure resistance even if a scratch is formed.
The sliding member of the present invention is a sliding member including a base layer and a resin coating layer formed on the base layer, wherein the resin coating layer is formed of a polyamide-imide resin as a binder, barium sulfate particles, molybdenum disulfide particles having an average particle diameter which is 1.0 time or more and 2.8 times or less the average particle diameter of the barium sulfate particles, and unavoidable impurities.

2 Claims, 11 Drawing Sheets

(51) Int. Cl.
  *C10M 107/44* (2006.01)
  *C10M 111/04* (2006.01)
  *C10N 50/08* (2006.01)
  *F16C 9/02* (2006.01)

(52) U.S. Cl.
  CPC ... *C10M 111/04* (2013.01); *C10M 2201/0663* (2013.01); *C10M 2201/084* (2013.01); *C10M 2217/0443* (2013.01); *C10N 2050/08* (2013.01); *F16C 9/02* (2013.01)

(58) Field of Classification Search
  CPC .... C10M 2201/0663; C10M 2201/084; C10M 2217/0443; C10N 2050/08
  See application file for complete search history.

(56) References Cited

U.S. PATENT DOCUMENTS

| | | | |
|---|---|---|---|
| 2005/0141791 A1 | 6/2005 | Roos et al. | |
| 2008/0159671 A1 | 7/2008 | Leonardelli | |
| 2008/0187260 A1* | 8/2008 | Schubert | C09D 5/00 384/294 |
| 2015/0018255 A1* | 1/2015 | Tomikawa | F16C 33/043 508/106 |
| 2017/0081522 A1 | 3/2017 | Adam et al. | |

FOREIGN PATENT DOCUMENTS

| | | | | |
|---|---|---|---|---|
| CN | 101267934 A | | 9/2008 | |
| CN | 106029794 A | | 10/2016 | |
| CN | 107477120 A | | 12/2017 | |
| DE | 102011077008 A1 | * | 12/2012 | ............... C08J 3/226 |
| EP | 2 157 135 A1 | | 2/2010 | |
| GB | 2521004 A | | 6/2015 | |
| JP | 62-184225 A | | 8/1987 | |
| JP | 2005251353 A | * | 9/2005 | ........... F16D 69/023 |
| JP | 2009-068584 A | | 4/2009 | |
| JP | 2009068584 A | * | 4/2009 | |
| JP | 5132806 B1 | | 1/2013 | |
| JP | 2013-072535 A | | 4/2013 | |
| JP | 2013-203970 A | | 10/2013 | |
| JP | 2016-173113 A | | 9/2016 | |
| JP | 2017-88741 A | | 5/2017 | |
| NL | 7807697 A | * | 1/1980 | ................ F02F 3/10 |
| WO | 2013/039177 A1 | | 3/2013 | |

OTHER PUBLICATIONS

Written Opinion of PCT/JP2019/033900 dated Nov. 12, 2019 [PCT/ISA/237].
Office Action dated Apr. 5, 2022 in Japanese Application No. 2018-235147.
Communication dated Jun. 14, 2022, issued in Chinese Application No. 201980076746.1.
Extended European Search Report dated Aug. 2, 2022 in European Application No. 19899869.2.
Communication dated Nov. 3, 2022 from the China National Intellectual Property Administration in Application No. 201980076746.1.

* cited by examiner

SLIDING MEMBER

CROSS REFERENCE TO RELATED APPLICATIONS

This application is a National Stage of International Application No. PCT/JP2019/033900 filed on Aug. 29, 2019, claiming priority based on Japanese Patent Application No. 2018-235147 filed on Dec. 17, 2018.

TECHNICAL FIELD

The present invention relates to a sliding member having a resin coating layer.

BACKGROUND ART

A sliding bearing in which adjustment particles and a plate-shaped solid lubricant are contained in a resin binder is known (see Patent Literature 1). Patent Literature 1 describes that the adjustment particles dam cracks and that the plate-shaped solid lubricant improves seizure resistance.

CITATIONS LIST

Patent Literature

Patent Literature 1: JP 2013-72535 A

SUMMARY OF INVENTION

Technical Problems

However, Patent Literature 1 involves a problem that, when a scratch is formed by a foreign matter, seizure is likely to occur around the scratch. Specifically, the problem is that, when a scratch is formed on the counter material by a foreign matter, the periphery of the scratch is raised to form a convex portion, and that seizure is likely to occur due to frictional heat concentrated at the convex portion.

The present invention has been made in view of the above problem, and an object of the present invention is to provide a technique capable of exhibiting high seizure resistance even if a scratch is formed.

Solutions to Problems

In order to achieve the above object, the sliding member of the present invention is a sliding member including a base layer and a resin coating layer formed on the base layer, wherein the resin coating layer is formed of a polyamide-imide resin as a binder, barium sulfate particles, molybdenum disulfide particles having an average particle diameter which is 1.0 time or more and 2.8 times or less the average particle diameter of the barium sulfate particles, and unavoidable impurities.

It can be confirmed that, by setting the average particle diameter of the molybdenum disulfide particles to 1.0 time or more and 2.8 times or less the average particle diameter of the barium sulfate particles, the barium sulfate particles contained in the resin coating layer are easily transferred to the counter material. The barium sulfate particles are transferred to the counter material, so that the counter material can be coated with the barium sulfate particles. Furthermore, it can also be confirmed that the components of the lubricating oil are easily transferred at locations where the barium sulfate particles are transferred. Therefore, even if a convex portion is formed in the vicinity of the scratch formed by the foreign matter, the possibility of occurrence of seizure can be reduced because the counter material is coated with the transferred components.

Further, the molybdenum disulfide particles may have an average particle diameter which is 1.7 times or more and 2.8 times or less the average particle diameter of the barium sulfate particles. It could be confirmed that the frictional resistance reduction rate between the sliding member and the counter material can be increased by setting the average particle diameter of the molybdenum disulfide particles to 1.7 times or more and 2.8 times or less the average particle diameter of the barium sulfate particles. The frictional resistance reduction rate is a degree of decrease in friction coefficient when materials are continuously rubbed, and means a value obtained by dividing the amount of decrease in friction coefficient when materials are continuously rubbed by the friction coefficient at the initial stage of rubbing (at the time of contact). It can be evaluated that the larger the frictional resistance reduction rate, the better the compatibility.

Further, an average particle diameter of the barium sulfate particles may be 0.3 μm or more and less than 0.7 μm. It could be confirmed that the frictional resistance between the sliding member and the counter material can be reduced by setting the average particle diameter of the barium sulfate particles to 0.3 μm or more and less than 0.7 μm. It could also be confirmed that the smoothness of the surface of the resin coating layer can be improved by setting the average particle diameter of the barium sulfate particles to 0.3 μm or more and less than 0.7 μm. Furthermore, it could be confirmed that it is optimal to set the average particle diameter of the barium sulfate particles to 0.3 μm or more and less than 0.7 μm from the viewpoint of improving the seizure resistance.

DETAILED DESCRIPTION OF PREFERRED EMBODIMENTS

Embodiments of the present invention will be described in the following order.

(1) Structure of sliding member:
(2) Method for manufacturing sliding member:
(3) Experimental result:
(4) Other embodiments:

(1) Structure of Sliding Member

Figure 1:
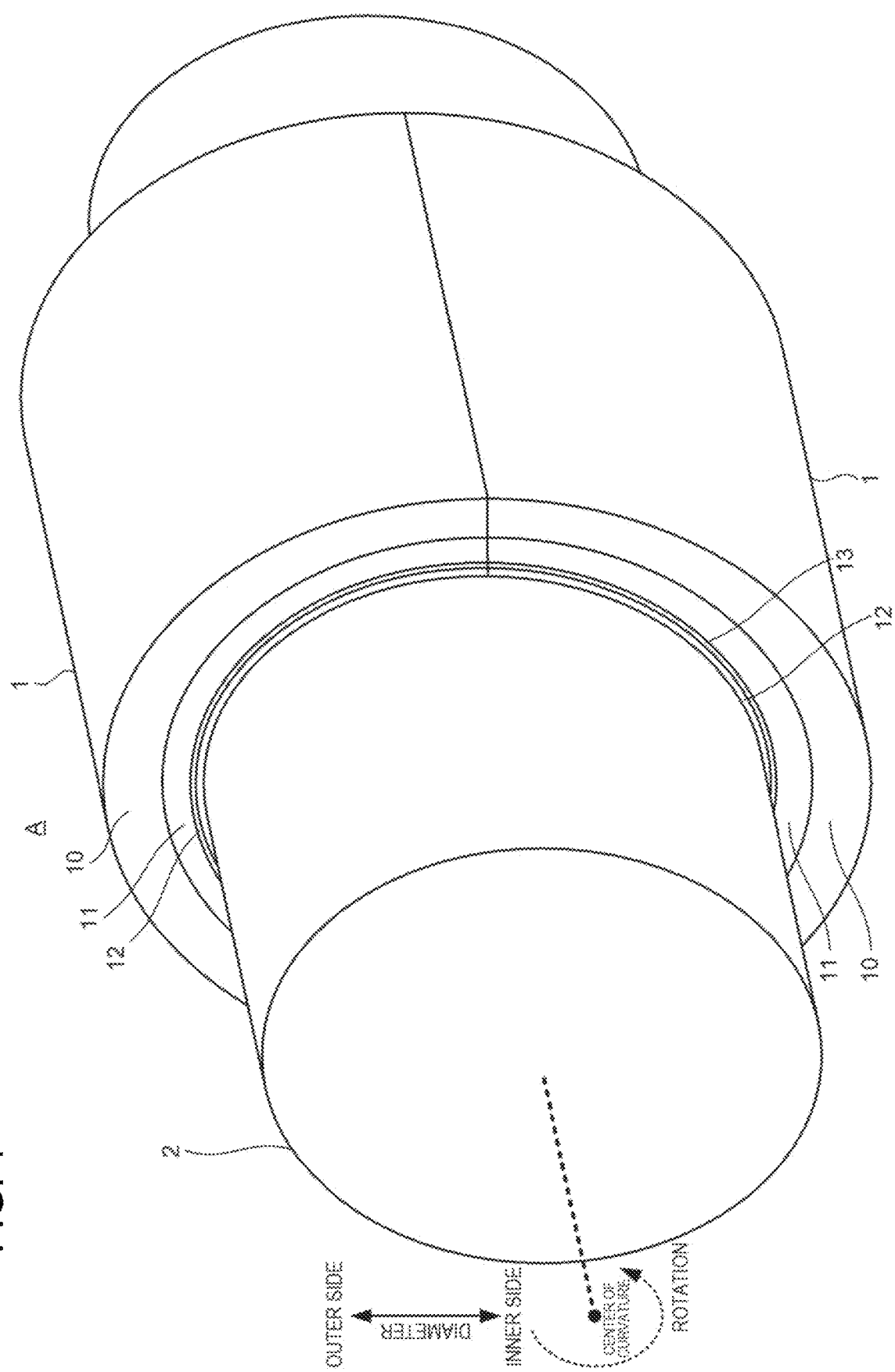
FIG. 1 is a perspective view of a sliding member according to an embodiment of the present invention.

FIG. 1 is a perspective view of a sliding member 1 according to one embodiment of the present invention. The sliding member 1 includes a back metal 10, a lining 11, and an overlay 12. The sliding member 1 is a half-shaped metallic member obtained by dividing a hollow cylinder into two equal parts in a diametrical direction, and has a semi-circular arc shape in cross section. By combining the two sliding members 1 so as to form a cylindrical shape, a sliding bearing A is formed. The sliding bearing A bears a counter material 2 having a cylindrical shape (crankshaft of an engine) in a hollow portion formed therein. The outer diameter of the counter material 2 is formed to be slightly smaller than the inner diameter of the sliding bearing A. A lubricating oil (engine oil) is supplied to a gap formed between the outer peripheral surface of the counter material 2 and the inner peripheral surface of the sliding bearing A. At that time, the outer peripheral surface of the counter material 2 slides on the inner peripheral surface of the sliding bearing A.

The sliding member 1 has a structure in which the back metal 10, the lining 11, and the overlay 12 are laminated in an order of being distant from the center of curvature. Therefore, the back metal 10 constitutes the outermost layer of the sliding member 1, and the overlay 12 constitutes the innermost layer of the sliding member 1. The back metal 10, the lining 11, and the overlay 12 each have a constant thickness in the circumferential direction. For example, the thickness of the back metal 10 is 1.1 mm to 1.3 mm, and the thickness of the lining 11 is 0.2 mm to 0.4 mm. For example, the back metal 10 is made of, for example, steel. The lining 11 is made of, for example, an Al alloy or a Cu alloy. The back metal 10 may be omitted.

The thickness of the overlay 12 is 6 μm. The thickness of the overlay 12 may be 2 to 15 μm, and is desirably 3 to 9 μm. Hereinafter, the term "inner side" means the curvature center side of the sliding member 1, and the term "outer side" means the side opposite to the center of curvature of the sliding member 1. The inner surface of the overlay 12 constitutes the sliding surface for the counter material 2.

Figure 2A:
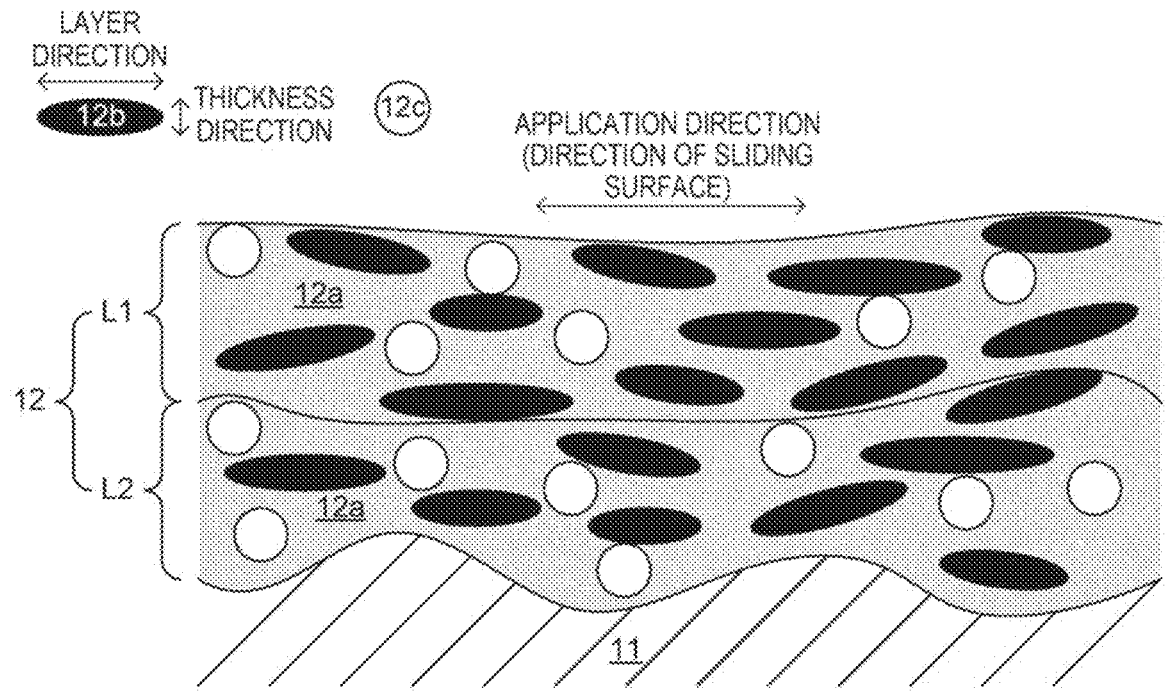
FIGS. 2A and 2B are schematic cross-sectional diagrams of an overlay.

FIG. 2A is a schematic cross-sectional diagram of the overlay 12. The overlay 12 is a layer laminated on the inner surface of the lining 11 and constitutes the resin coating layer of the present invention. The overlay 12 is formed of a binder resin 12a (gray), molybdenum disulfide particles 12b (black circles), barium sulfate particles 12c (white circles), and unavoidable impurities. The binder resin 12a is a polyamide-imide resin.

In the present embodiment, the volume fraction of the total volume of the molybdenum disulfide particles 12b in the overlay 12 is 30% by volume, and the volume fraction of the total volume of the barium sulfate particles 12c therein is 15% by volume. The molybdenum disulfide particles 12b have a total volume 2 times the total volume of the barium sulfate particles 12c. The total volume of the binder resin 12a and the molybdenum disulfide particles 12b and the total volume of the barium sulfate particles 12c were calculated based on the masses of the binder resin 12a, the molybdenum disulfide particles 12b, and the barium sulfate particles 12c measured before mixing and their specific weights.

The average particle diameter of the molybdenum disulfide particles 12b is 1.4 μm, and the average particle diameter of the barium sulfate particles 12c is 0.6 μm. The average particle diameter of the molybdenum disulfide particles 12b is 2.33 times the average particle diameter of the barium sulfate particles 12c. The average particle diameters of the barium sulfate particles 12c and the molybdenum disulfide particles 12b were measured by MT3300II of MicrotracBEL Corp. Hereinafter, the value obtained by dividing the average particle diameter of the molybdenum disulfide particles 12b by the average particle diameter of the barium sulfate particles 12c is referred to as average particle diameter ratio. The molybdenum disulfide particles 12b are layered particles, and the barium sulfate particles 12c are massive particles. The overlay 12 is composed of two overcoated application layers (outermost layer L1 and inner layer L2), and the outermost layer L1 and the inner layer L2 each have a film thickness of 3 μm.

A sample in which the overlay 12 of the present embodiment described above was coated on a flat plate was prepared, and Rpk, Ra, the orientation rate, the transferred amount, the friction coefficient, the frictional resistance reduction rate, and the seizure surface pressure were measured.

Rpk and Ra are surface roughnesses according to JIS B0671-2002 and JIS B0601-2001, respectively, which are surface roughnesses of the surface (sliding surface) of the overlay 12. The Rpk (0.08) was 0.162 μm when the cutoff value λc was 0.08 mm, and the Ra (0.8) was 0.151 μm when the cutoff value λc was 0.8 mm. The Rpk and Ra were measured by Surf Coder SE-3400 manufactured by Kosaka Laboratory Ltd. The cutoff value λc is set to 0.08 mm, thereby making it possible to obtain Rpk (0.08) showing the roughness obtained by removing the influence of the waviness of the groove having a period of about 0.08 mm formed on the surface of the lining 11.

The orientation rate of {002}, {004} and {008} of molybdenum disulfide in the overlay 12 of the present embodiment was 87%. In addition, the orientation rate of {002}, {004}, {006} and {008} of molybdenum disulfide in the overlay 12 of the present embodiment was 89.9%. The orientation rate is a proportion obtained by dividing the total intensity of the X-ray diffracted electron beams generated on the crystal planes {002} {004} and {008} or {002} {004} {006} and {008} of molybdenum disulfide by the total intensity of the diffracted electron beams generated on all the crystal planes. The orientation rate is an index showing how much the crystal planes {002} {004} and {008} or {002} {004} {006} and {008} are oriented in the direction orthogonal to the surface of the overlay 12. The intensity of the diffracted electron beams was measured by SmartLab of Rigaku Corporation. The higher the orientation rate, the higher the parallelism of the layer direction of the molybdenum disulfide particles 12b with respect to the sliding surface.

The film thickness of the outermost layer L1 among the plurality of overcoated application layers is set to 3 μm, thereby making it possible to suppress the amount of shrinkage of the binder resin 12a during curing of the outermost layer L1. Therefore, it is possible to reduce the unevenness between the site where the molybdenum disulfide particles 12b are present and the site where the molybdenum disulfide particles 12b are absent. Further, the film thickness of the outermost layer is set to twice or less the average particle diameter of the molybdenum disulfide particles 12b, that is, 4 μm or less (preferably 1 to 2.5 μm), thereby making it possible to orient the layer direction of the layered molybdenum disulfide particles 12b in the application direction (direction of the sliding surface).

That is, the thickness direction of the molybdenum disulfide particles 12b can be oriented in the direction orthogonal to the application direction, that is, in the direction of shrinkage of the binder during curing. As a result, the thickness of the molybdenum disulfide particles 12b in the shrinkage direction of the binder could be suppressed, and the unevenness between the site where the molybdenum disulfide particles 12b are present and the site where the molybdenum disulfide particles 12b are absent could be reduced.

Figure 2B:
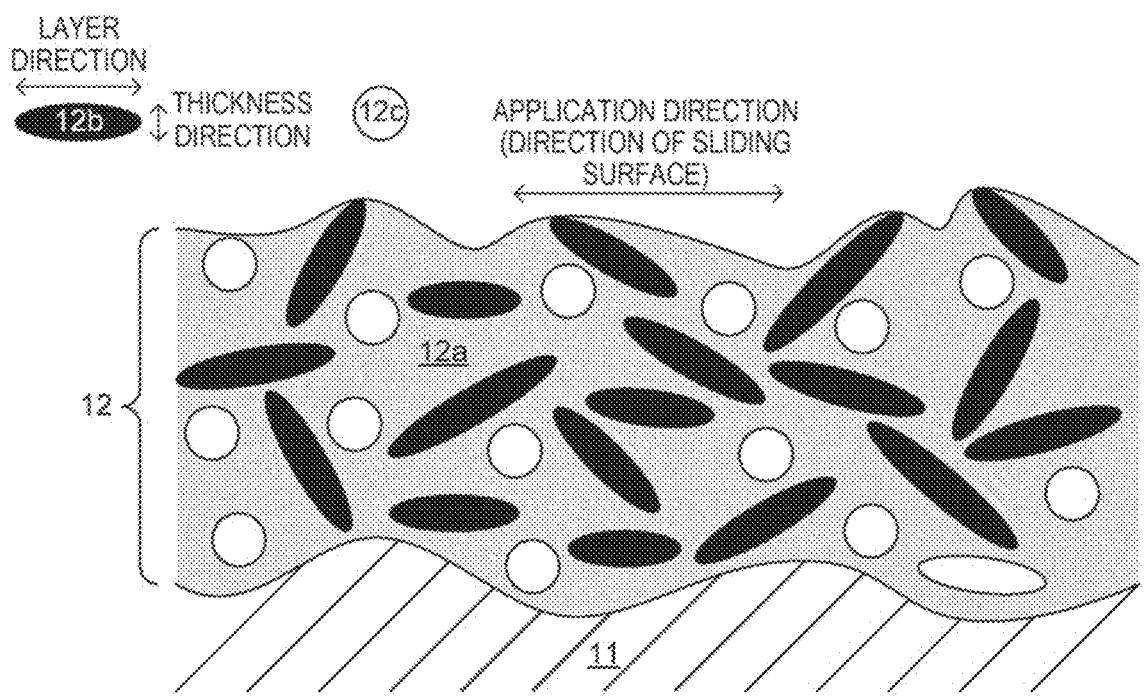

If the overlay 12 is formed by a single application layer as shown in FIG. 2B, the degree of freedom of rotation of the molybdenum disulfide particles 12b at the time of coating is increased, so that the layer direction of the molybdenum disulfide particles 12b can be oriented in a direction close to the direction orthogonal to the sliding surface. As a result, the height of the unevenness increases due to the difference in amount of shrinkage between the molybdenum disulfide particles 12b and the binder resin 12a in the direction orthogonal to the sliding surface.

Further, the average particle diameter of the barium sulfate particles 12c is reduced, so that, even when the massive or spherical barium sulfate particles 12c whose orientation cannot be controlled, as shown in FIG. 2A, are used, the amount of the unevenness caused by the barium sulfate particles 12c can be reduced. As a result, the Rpk of the surface of the outermost layer L1 could be reduced.

Figure 3:
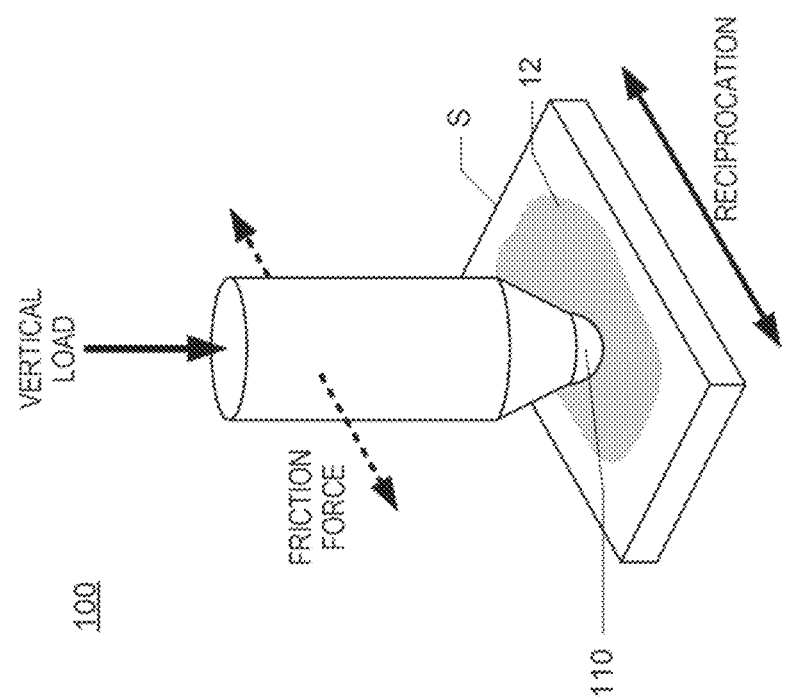
FIG. 3 is a schematic diagram of a reciprocating sliding test.

A reciprocating sliding test was conducted on the above-described sample with a ball-on-plate tester to measure the transferred amount, the friction coefficient, and the frictional resistance reduction rate. FIG. 3 is a schematic diagram of a ball-on-plate tester 100. The ball-on-plate tester 100 was used to reciprocate a sample S with the overlay 12 of the sample S in contact with a ball 110 formed of the same material (SUJ2 of JIS4805) as the counter material. The one-way distance of reciprocating movement was set to 20 mm, and the reciprocating sliding test was continued until 50 reciprocations.

Further, a static load was applied to the ball 110 so that a vertical load of 9.8 N was applied from the ball 110 to the sample S. Further, the contact point between the sample S and the ball 110 was immersed in engine oil (not shown, for example, 0W-20) at 140° C. A load sensor (not shown) was connected to the ball 110, and the frictional force applied to the ball 110 in the sliding direction was measured with the load sensor (not shown). Then, the frictional force was divided by the vertical load to measure the friction coefficient.

The friction coefficient at the first reciprocation was 0.092, and the friction coefficient at the 50th reciprocation was 0.044, which was good. In addition, the frictional resistance reduction rate obtained by dividing the amount of decrease in friction coefficient (obtained by subtracting the final friction coefficient at the 50th reciprocation from the initial friction coefficient at the first reciprocation) by the initial friction coefficient was as good as 47.513%. It is considered that good friction coefficient and frictional resistance reduction rate were obtained due to a small Rpk of the surface of the outermost layer L1 and a smooth sliding surface as described above.

After the reciprocating sliding test was conducted until 50 reciprocations, each element transferred to a site where the sample S slid (analysis range of 100×100 μm), on the ball 110, was quantitatively analyzed. The amount of the element (amount of the element transferred) was measured with JXA-8100 of JEOL Ltd.

Figure 4:
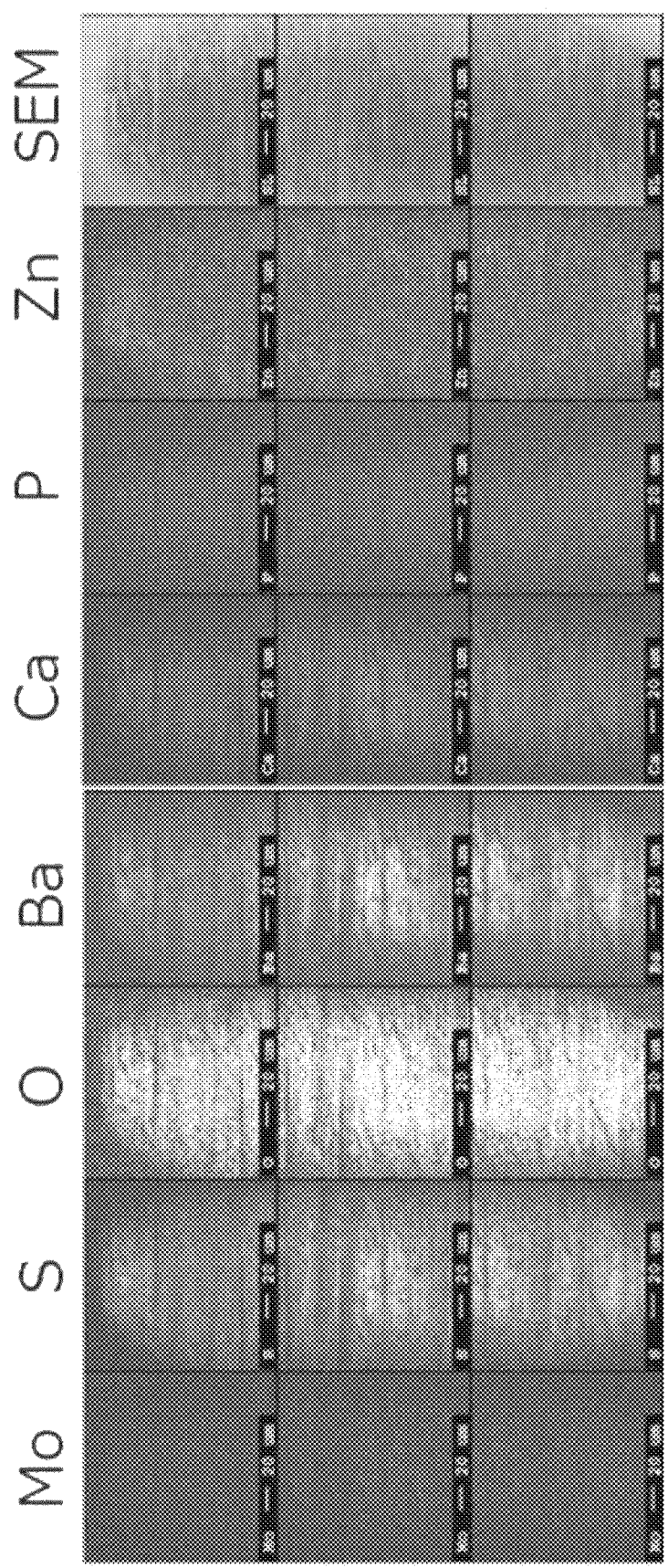
FIG. 4 is a map of elements transferred to a counter material.

FIG. 4 is a photograph showing the results of the quantitative analysis in the analysis range on the ball 110 where the sample S slid. In the figure, lighter gray indicates a larger amount of each element present on the surface of the ball 110. At the site, on the ball 110, where the sample S slid, three analysis ranges were analyzed so as to be continuous in the vertical direction of the paper surface. As shown in FIG. 4, it can be confirmed that Ba derived from the barium sulfate particles 12c contained in the sample S was transferred to the surface of the ball 110.

Since Ba is a component that was not contained in either the ball 110 or the lubricating oil, it can be determined that the barium sulfate particles 12c contained in the overlay 12 of the sample S were partially transferred to the surface of the ball 110. Similarly, it can be confirmed that O and S constituting barium sulfate were also transferred to the surface of the ball 110. It can also be confirmed that Mo constituting molybdenum disulfide contained in the sample S and the lubricating oil was also transferred to the surface of the ball 110. Furthermore, it can be confirmed that Ca and Zn contained only in the lubricating oil were also transferred to the surface of the ball 110. It was found that the total mass concentration of the transferred components (Ba, S, O, Mo, Ca, and Zn) on the surface of the ball 110 reached 7.3 mass %. These transferred components are components that contribute to the reduction in frictional resistance and the improvement in seizure resistance. Most of the total mass of the transferred components can be regarded as the mass of barium sulfate.

The above-described sliding member 1 was formed, and a bearing sliding test simulating the actual usage environment, as shown in FIG. 1, was conducted to measure the transferred amount, the friction coefficient, and the frictional resistance reduction rate. In the bearing sliding test, SUJ2 of JIS4805 was used as the material for the counter material 2.

A linear scratch was formed in advance on the sliding member 1 in the circumferential direction. A scratch is a site where the surface of the sliding member 1 is recessed, and a pair of convex portions are formed by raising the surface of the sliding member 1 in a ridge shape on both sides in the width direction of the scratch along the scratch. The scratch was formed so that the average width (the length from the end of the hem of one convex portion to the end of the hem of the other convex portion) and height of the pair of convex portions were 500 μm and 40 μm, respectively. Since frictional heat between the ball 110 and the sample S is concentrated and generated at the convex portions, the seizure surface pressure is reduced.

The relative speed between the sliding member 1 and the counter material 2 was set to 20 m/s, and engine oil (not shown, for example, 0W-20) at 140° C. was supplied between the sliding member 1 and the counter material 2. The amount of the engine oil supplied was set to 1 L/min. In addition, a static load was applied to the counter material 2 so that a vertical load in the radial direction was applied from the counter material 2 to the sliding member 1, and the vertical load was increased by 3 kN every 3 min. The seizure surface pressure was then derived from the vertical load when seizure finally occurred. As a result, a good seizure surface pressure of 86 MPa was obtained. It was determined that seizure had occurred, based on the fact that the frictional force applied to the counter material 2 was 10 N or more.

As described above, the barium sulfate particles 12c are transferred to the counter material 2, so that the counter material can be coated with the barium sulfate particles 12c. Furthermore, it could also be confirmed that the components of the lubricating oil are easily transferred at locations where the barium sulfate particles 12c are transferred. Therefore, even if a convex portion is formed in the vicinity of the scratch formed by the foreign matter, the possibility of occurrence of seizure can be reduced by coating the counter material with the transferred components. As a result, a good seizure surface pressure was obtained.

(2) Method for Manufacturing Sliding Member

The sliding member 1 was formed by performing (a) a half-shaped base material formation step, (b) a pre-application treatment step, (c) a first application step, (d) a second application step, (e) a drying step, and (f) a firing step. However, the manufacturing method for the sliding member 1 is not limited to the above-described process.

(a) Half-Shaped Base Material Formation Step

The half-shaped base material formation step is a step of forming a half-shaped base material in which the back metal 10 and the lining 11 are joined. For example, the material of the lining 11 may be sintered on a plate material corresponding to the back metal 10 to form a base material in which the back metal 10 and the lining 11 are joined. Further, the back metal 10 and a plate material corresponding to the lining 11 may be joined by rolling to form a base material in which the back metal 10 and the lining 11 are joined. Further, the base material in which the back metal 10 and the lining 11 are joined may be processed into a half shape by performing machining such as press working or cutting.

(b) Pre-Application Treatment Step

The pre-application treatment step is a surface treatment for improving the adhesion of the overlay 12 (resin coating layer) to the surface of the lining 11. For example, as the pre-application treatment step, a roughening treatment such as sandblasting may be performed, or a chemical treatment such as etching or chemical conversion treatment may be performed. The pre-application treatment step is preferably performed after degrease of the oil content of the half-shaped base material with a cleaning agent.

(c) First Application Step

The first application step is a step of applying the inner layer L2 of the overlay 12 onto the lining 11. In performing the first application step, an application liquid in which the molybdenum disulfide particles 12b and the barium sulfate particles 12c are mixed with a polyamide-imide binder resin is prepared. In addition, in order to improve the dispersibility of the molybdenum disulfide particles 12b and the barium sulfate particles 12c and to adjust the viscosity of the application liquid, a solvent such as N-methyl-2-pyrrolidone or xylene may be used as necessary.

The molybdenum disulfide particles 12b and the barium sulfate particles 12c are blended in the application liquid, so that the volume fraction of the total volume of the molybdenum disulfide particles 12b in the overlay 12 is 30% by volume, and that the volume fraction of the total volume of the barium sulfate particles 12c therein is 15% by volume. Further, the molybdenum disulfide particles 12b having an average particle diameter of 1.4 μm and the barium sulfate particles 12c having an average particle diameter of 0.6 μm are blended in an application liquid.

The first application step is performed by adhering the application liquid to a cylindrical application roll having a diameter smaller than the inner diameter of the lining 11 and rotating the application roll on the inner surface of the lining 11. By adjusting the roll gap between the application roll and the inner surface of the lining 11 and the viscosity of the application liquid, the application liquid may be applied onto the inner surface of the lining 11 to a thickness that makes the film thickness 3 μm after the (g) firing step which will be described later.

(d) Second Application Step

Thereafter, in the second application step, an application liquid is applied in the same manner as in the first application step. A drying step which will be described later may be performed between the first application step and the second application step.

(e) Drying Step

The drying step is a step of drying the outermost layer L1 and the inner layer L2. For example, the outermost layer L1 and the inner layer L2 are dried at 40 to 120° C. for 5 to 60 minutes.

(f) Firing Step

Further, for example, the outermost layer L1 and the inner layer L2 were fired (cured) at 150 to 300° C. for 30 to 60 minutes.

The sliding member 1 is completed through the above steps.

(3) Experimental Result

Table 1 shows the results of various measurements for Samples 1 to 9. The methods for measurement of various measured values for Samples 1 to 9 are the same as the methods for measurement of various measured values in the first embodiment.

TABLE 1

|  | BaSo4 average particle diameter [μm] | MoS2 average particle diameter [μm] | Average particle diameter ratio (MoS2/BaSO4) | Transferred amount [mass %] | Friction coefficient | Frictional resistance reduction rate [%] | Rpk (0.08) [μm] | Ra (0.8) [μm] | Orientation rate [%] | Seizure surface pressure [MPa] |
|---|---|---|---|---|---|---|---|---|---|---|
| Sample 1 | 2.0 | 2.0 | 1.00 | 7.45 | 0.046 | 45.439 | 0.401 | 0.343 | 88 | — |
| Sample 2 | 2.0 | 1.4 | 0.70 | 6.16 | 0.051 | 40.057 | 0.285 | 0.242 | 84.8 | 51 |
| Sample 3 | 2.0 | 1.0 | 0.50 | 3.7 | 0.049 | 43.246 | 0.331 | 0.330 | 82.1 | — |
| Sample 4 | 0.6 | 2.0 | 3.33 | 5.84 | 0.046 | 46.000 | 0.271 | 0.342 | 90 | — |
| Sample 5 | 0.6 | 1.4 | 2.33 | 7.27 | 0.044 | 47.513 | 0.162 | 0.151 | 87 | 86 |
| Sample 6 | 0.6 | 1.0 | 1.67 | 7.3 | 0.040 | 48.008 | 0.139 | 0.258 | 84.1 | — |
| Sample 7 | 0.3 | 2.0 | 6.67 | 4.81 | 0.048 | 42.934 | 0.293 | 0.297 | 92.8 | — |
| Sample 8 | 0.3 | 1.4 | 4.67 | 5.02 | 0.050 | 43.440 | 0.391 | 0.167 | 91.7 | — |
| Sample 9 | 0.3 | 1.0 | 3.33 | 5.19 | 0.046 | 42.383 | 0.238 | 0.411 | 89.2 | 64 |

Samples 1 to 9 are the samples S coated with the overlays 12 which are different in combination of the average particle diameters of the molybdenum disulfide particles 12b and the barium sulfate particles 12c. Sample 5 is the same as that of the first embodiment. Further, Samples 1 to 4 and 6 to 9 are the same as those of the first embodiment in terms of the features except for the combination of the average particle diameters of the molybdenum disulfide particles 12b and the barium sulfate particles 12c.

Therefore, in all of Samples 1 to 9, the overlay 12 is formed by two layers, the outermost layer L1 and the inner layer L2, each having a thickness of 3 μm. In all of Samples 1 to 9, the volume fraction of the total volume of the molybdenum disulfide particles 12b in the overlay 12 is 30% by volume, and the volume fraction of the total volume of the barium sulfate particles 12c therein is 15% by volume.

Figure 5A:
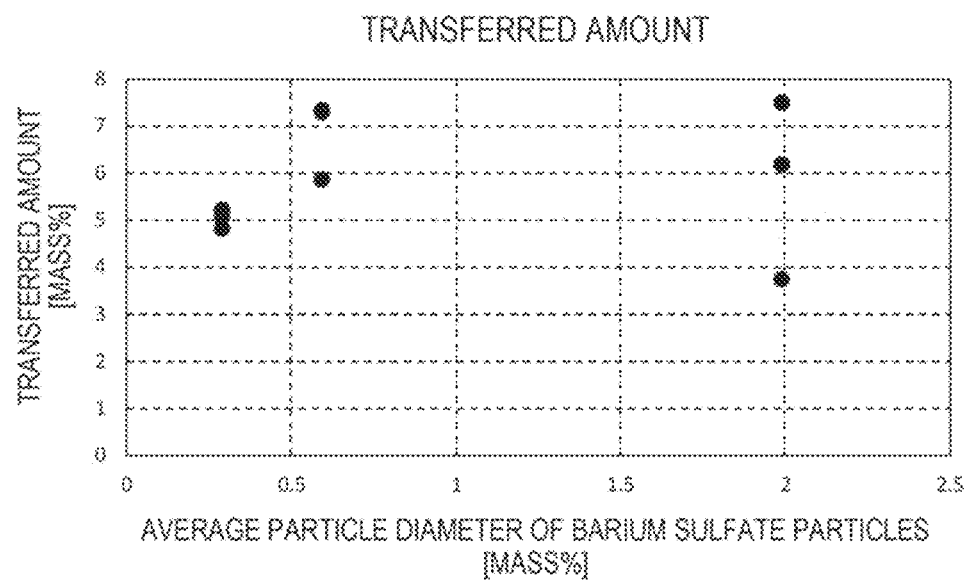
FIGS. 5A to 5C are graphs of transferred amount.
Figure 5B:
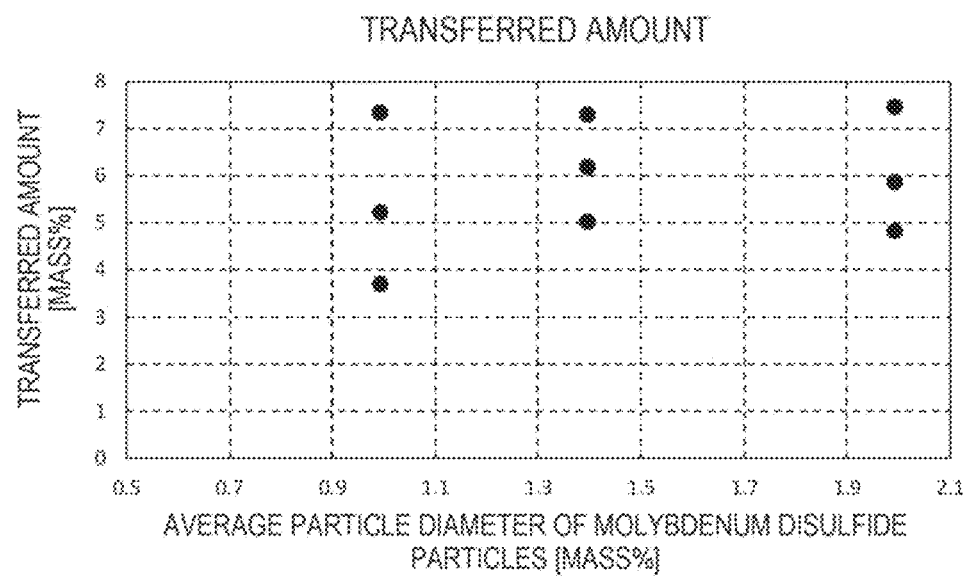
Figure 5C:
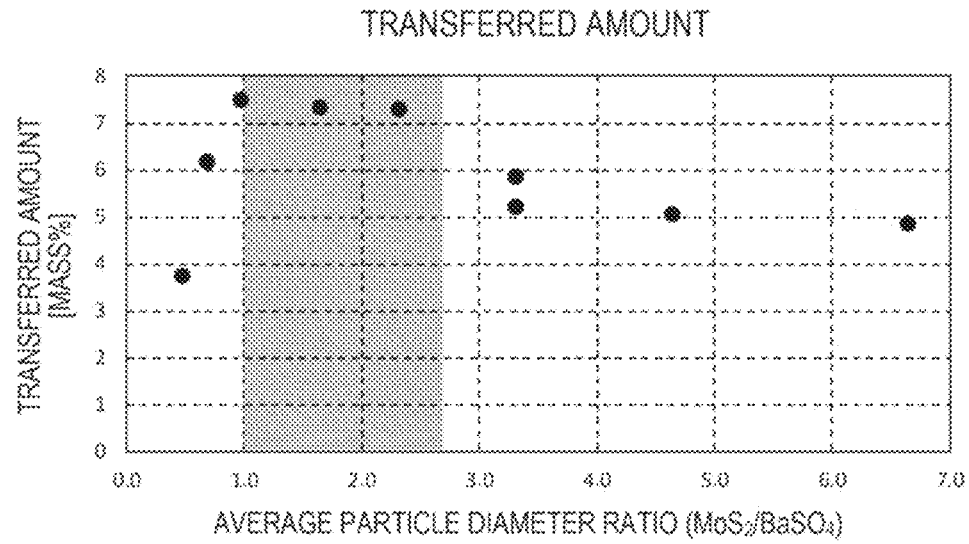

FIGS. 5A to 5C are graphs showing the relationship between the transferred amount and each of the average particle diameters of the molybdenum disulfide particles 12b and the barium sulfate particles 12c. The transferred amount is an amount of Ba transferred from Samples 1 to 9 to the ball 110 after the reciprocating sliding test was conducted. The vertical axis of FIGS. 5A to 5C shows the transferred amount. The horizontal axis of FIG. 5A shows the average particle diameter of the barium sulfate particles 12c, and the horizontal axis of FIG. 5B shows the average particle diameter of the molybdenum disulfide particles 12b. The horizontal axis in FIG. 5C shows the average particle diameter ratio.

As shown in FIGS. 5A and 5B, the correlation between each of the average particle diameters of the molybdenum disulfide particles 12b and the barium sulfate particles 12c and the transferred amount is weak. On the other hand, as shown in FIG. 5C, there is a correlation that can be expressed by an upwardly convex function between the average particle diameter ratio and the transferred amount. As shown in gray in FIG. 5C, it has been found that a good transferred amount can be obtained by setting the average particle diameter ratio to 1.0 to 2.8. Furthermore, as shown in Table 1, it has been found that a good seizure surface pressure can be obtained as the transferred amount increases.

Figure 6A:
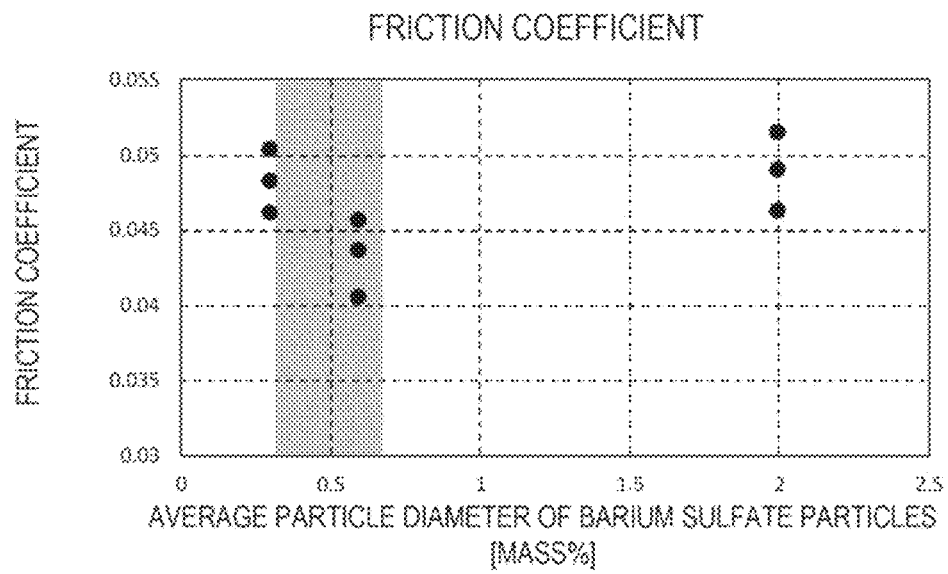
FIGS. 6A to 6C are graphs of friction coefficient.
Figure 6B:
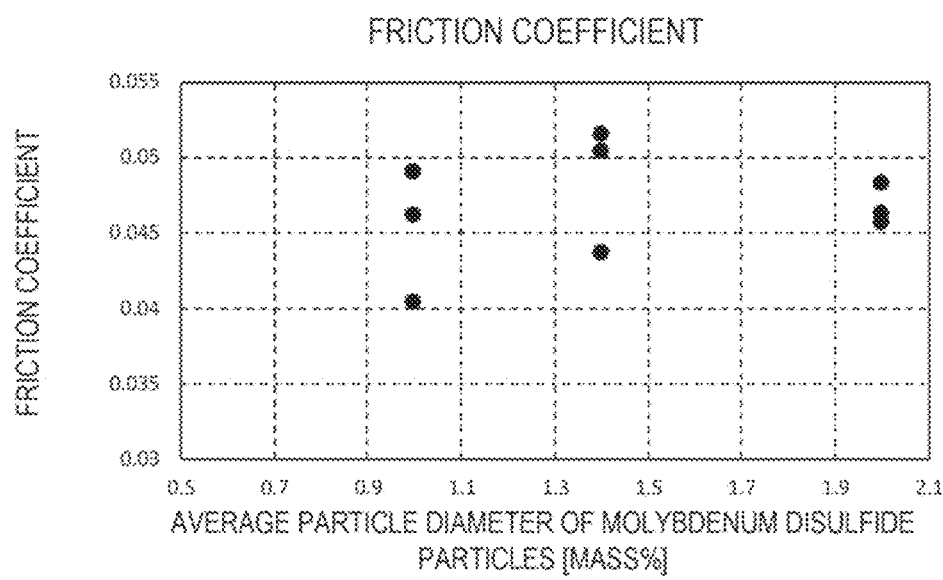
Figure 6C:
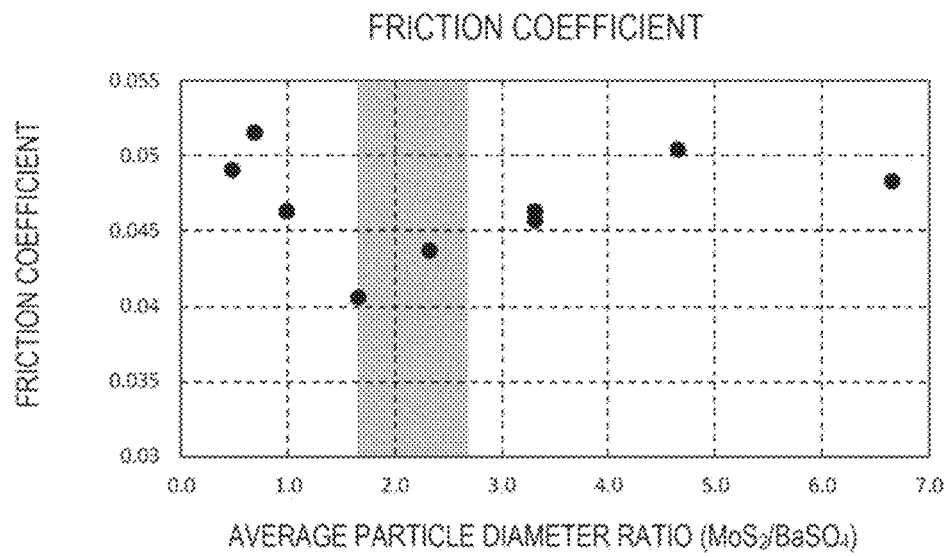
Figure 7A:
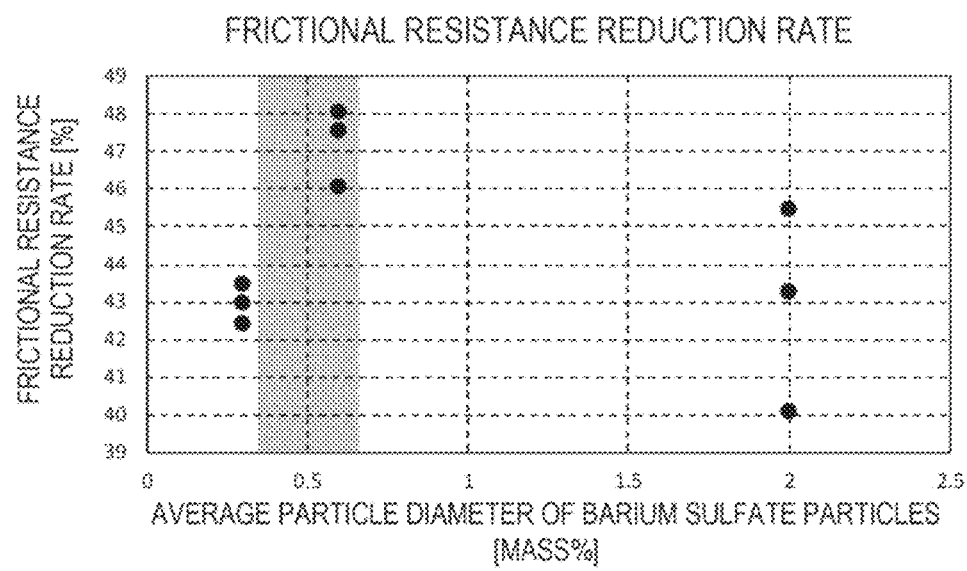
FIGS. 7A to 7C are graphs of frictional resistance reduction rate.
Figure 7B:
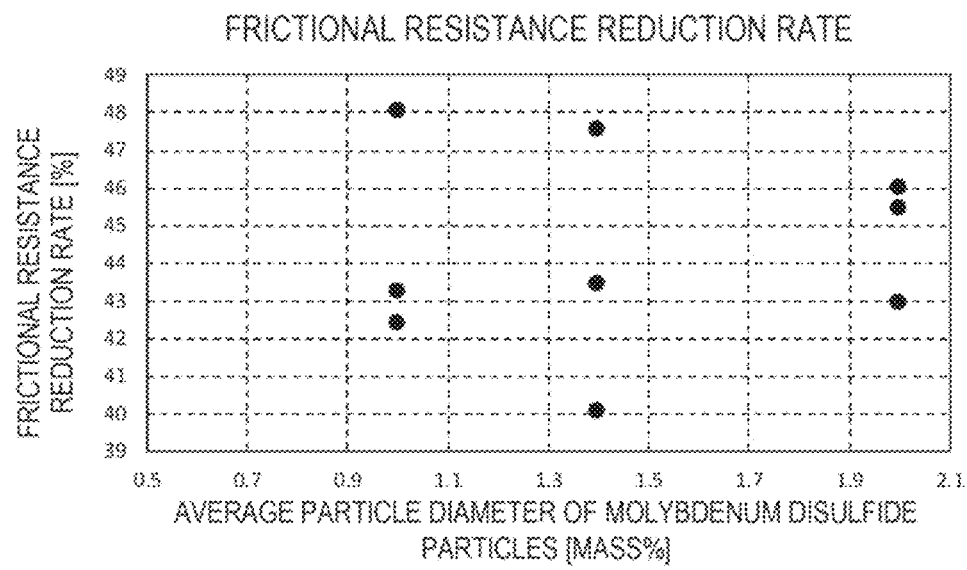
Figure 7C:
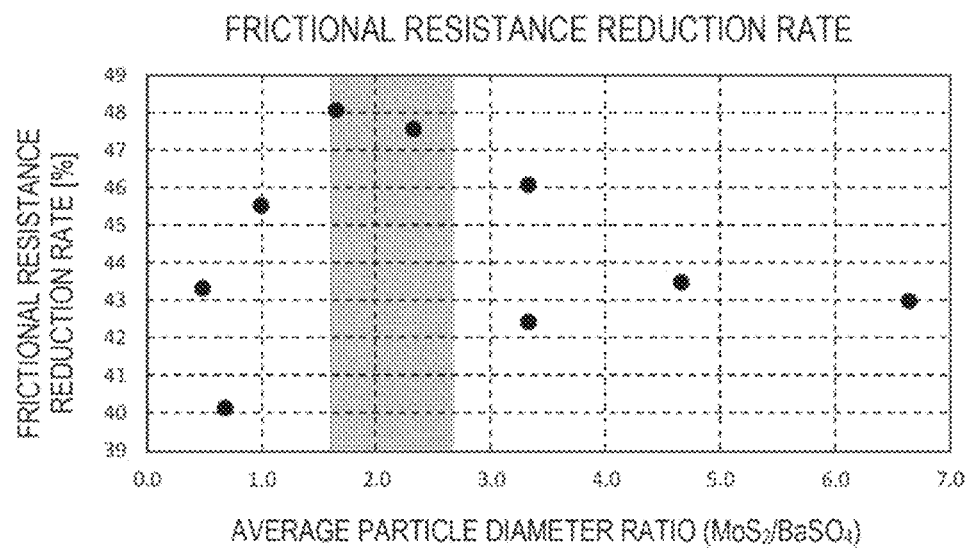

FIGS. 6A to 6C are graphs showing the relationship between the friction coefficient and each of the average particle diameter of the molybdenum disulfide particles 12b and the average particle diameter of the barium sulfate particles 12c. The vertical axis of FIGS. 6A to 6C shows the friction coefficient. FIGS. 7A to 7C are graphs showing the relationship between the frictional resistance reduction rate and each of the average particle diameter of the molybdenum disulfide particles 12b and the average particle diameter of the barium sulfate particles 12c. The vertical axis of FIGS. 6A to 6C shows the frictional resistance reduction rate. The horizontal axis of FIGS. 6A and 7A shows the average particle diameter of the barium sulfate particles 12c, the horizontal axis of FIGS. 6B and 7B shows the average particle diameter of the molybdenum disulfide particles 12b, and the horizontal axis of FIGS. 6C and 7C shows the average particle diameter ratio.

As shown in FIG. 6A, there is a correlation that can be expressed by a downwardly convex function between the average particle diameter of the barium sulfate particles 12c and the friction coefficient. Further, as shown in FIG. 7A, there is a correlation that can be expressed by an upwardly convex function between the average particle diameter of the barium sulfate particles 12c and the frictional resistance reduction rate. As shown in gray in FIGS. 6A and 7A, it has been found that good friction coefficient and frictional resistance reduction rate can be obtained by setting the average particle diameter of the barium sulfate particles 12c to 0.3 to 0.7 μm.

As shown in FIG. 6C, there is a correlation that can be expressed by a downwardly convex function between the average particle diameter ratio and the friction coefficient. Further, as shown in FIG. 7C, there is a correlation that can be expressed by an upwardly convex function between the average particle diameter ratio and the frictional resistance reduction rate. As shown in gray in FIGS. 6C and 7C, it has been found that good friction coefficient and frictional resistance reduction rate can be obtained by setting the average particle diameter ratio to 1.7 to 2.8. Further, as shown in FIGS. 5C, 6C, and 7C, it has been found that the friction coefficient and frictional resistance reduction rate become good when the amount of Ba transferred increases.

Figure 8A:
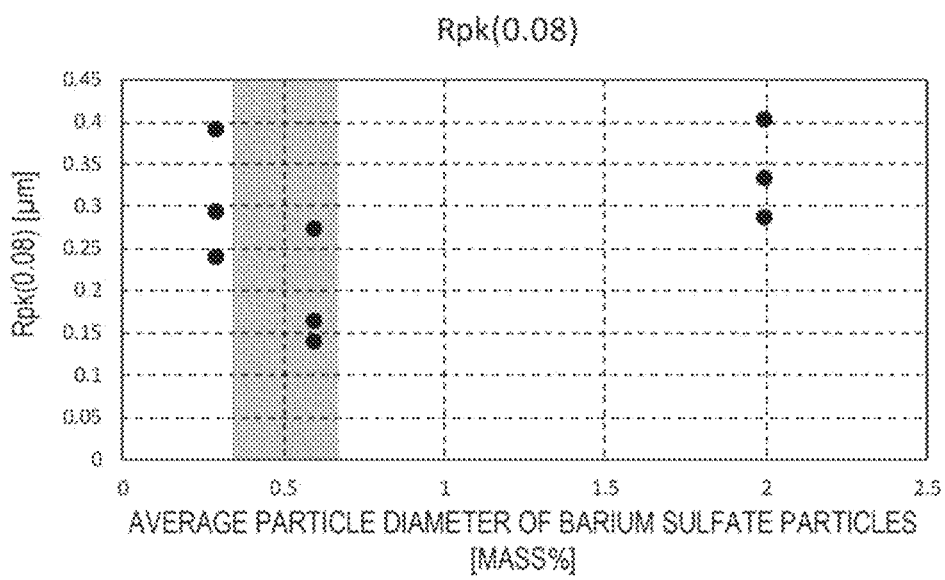
FIGS. 8A to 8C are graphs of Rpk (0.08).
Figure 8B:
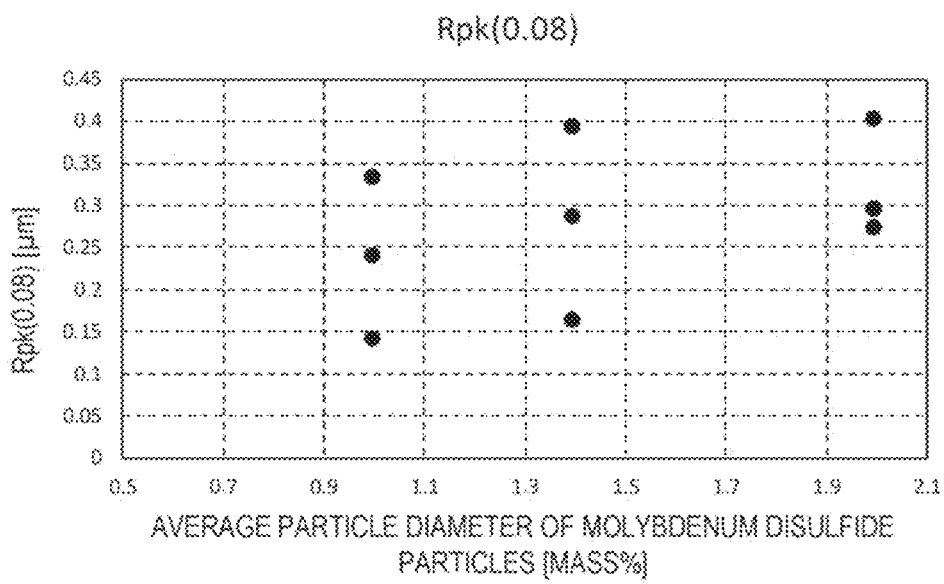
Figure 8C:
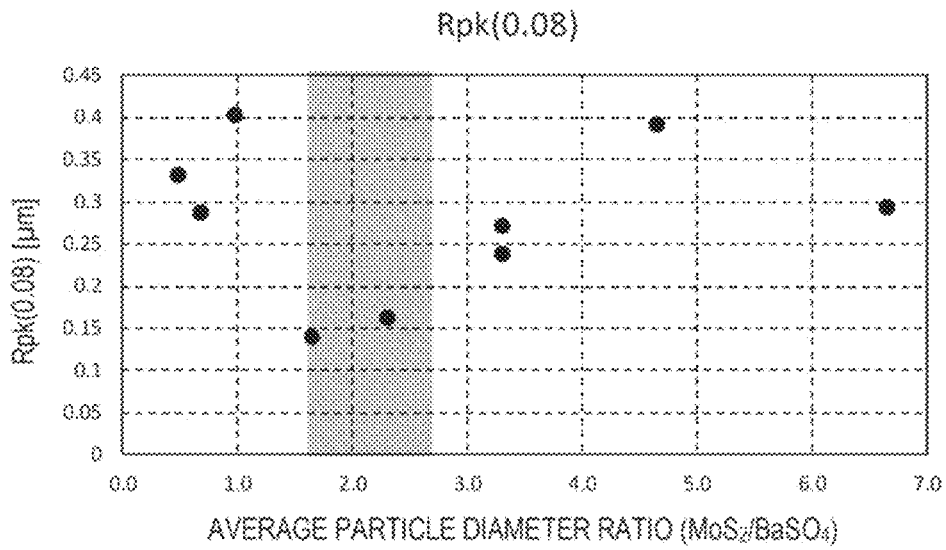
Figure 9A:
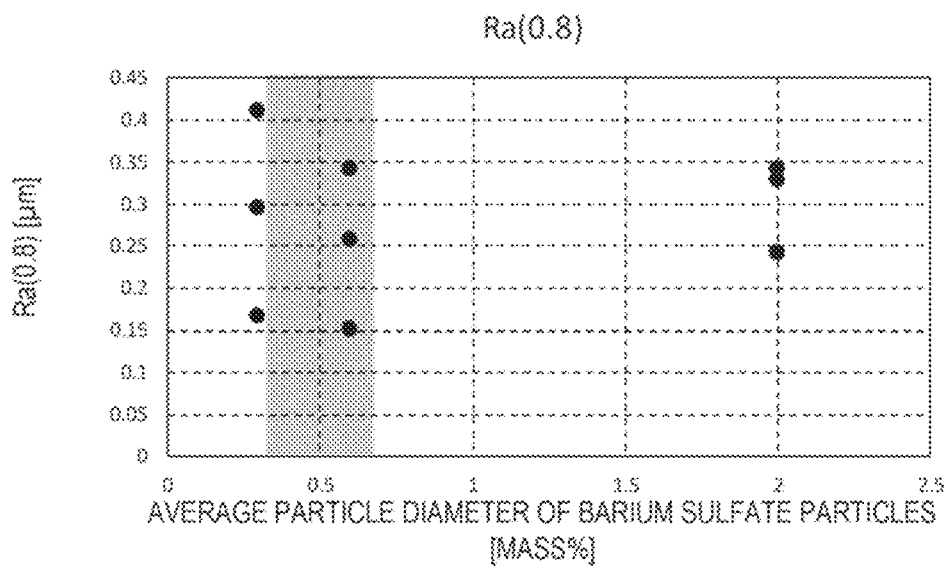
FIGS. 9A to 9C are graphs of Ra (0.8).
Figure 9B:
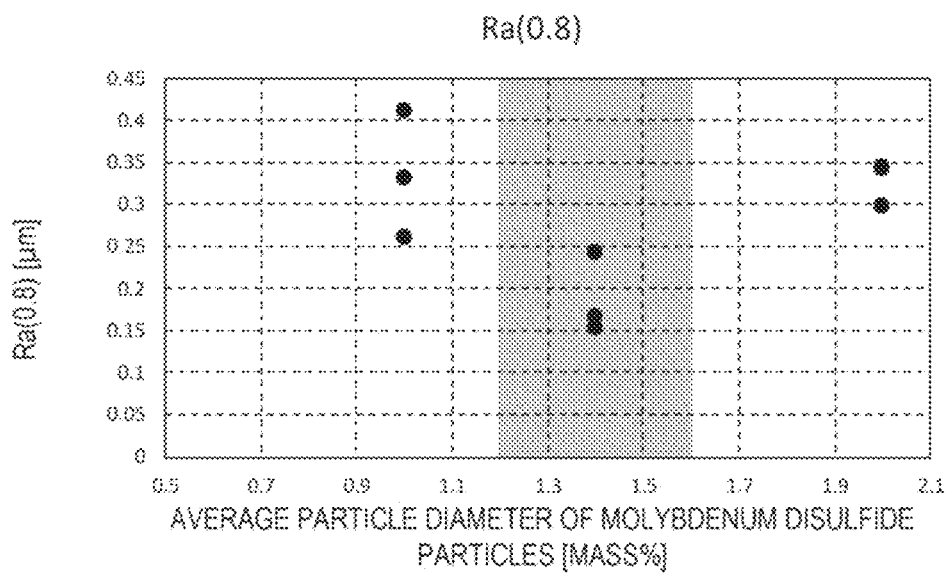
Figure 9C:
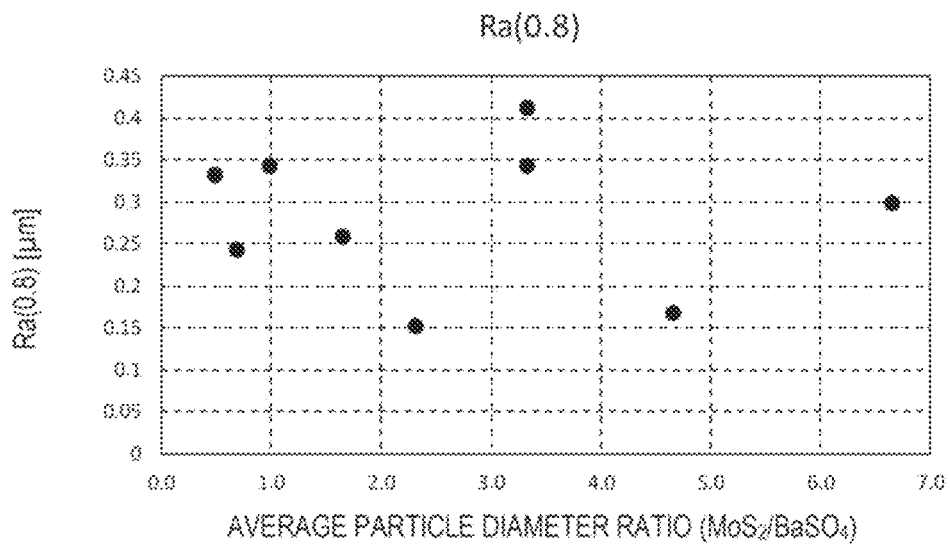

FIGS. 8A to 8C are graphs showing the relationship between Rpk (0.08) and each of the average particle diameters of the molybdenum disulfide particles 12b and the average particle diameter of the barium sulfate particles 12c. The vertical axis of FIGS. 8A to 8C shows Rpk (0.08). FIGS. 9A to 9C are graphs showing the relationship between Ra (0.8) and each of the average particle diameters of the molybdenum disulfide particles 12b and the average particle diameter of the barium sulfate particles 12c. The vertical axis of FIGS. 9A to 9C shows Ra (0.8). The horizontal axis of FIGS. 8A and 9A shows the average particle diameter of the barium sulfate particles 12c, the horizontal axis of FIGS. 8B and 9B shows the average particle diameter of the molybdenum disulfide particles 12b, and the horizontal axis of FIGS. 8C and 9C shows the average particle diameter ratio.

As shown in FIGS. 8A and 9A, there is a correlation that can be expressed by a downwardly convex function between the average particle diameter of the barium sulfate particles 12c and each of Rpk (0.08) and Ra (0.8). As shown in gray in FIGS. 8A and 9A, it has been found that good Rpk can be obtained by setting the average particle diameter of the barium sulfate particles 12c to 0.3 to 0.7 μm.

As shown in FIG. 9B, there is a correlation that can be expressed by a downwardly convex function between the average particle diameter of the molybdenum disulfide particles 12b and Ra (0.8). As shown in gray in FIG. 9B, it has been found that good Ra (0.8) can be obtained by setting the average particle diameter of the barium sulfate particles 12c molybdenum disulfide particles 12b to 1.2 to 1.6 μm.

In addition, as shown in FIG. 8C, there is a correlation that can be expressed by a downwardly convex function between the average particle diameter ratio and Rpk (0.08). As shown in gray in FIG. 8C, it has been found that good Rpk (0.08) can be obtained by setting the average particle diameter ratio to 1.7 to 2.8. In addition, it has been found that, by adopting the average particle diameter of the molybdenum disulfide particles 12b and the average particle diameter of the barium sulfate particles 12c, which have good Rpk (0.08) and Ra (0.8), good friction coefficient and frictional resistance reduction rate can be obtained.

Figure 10A:
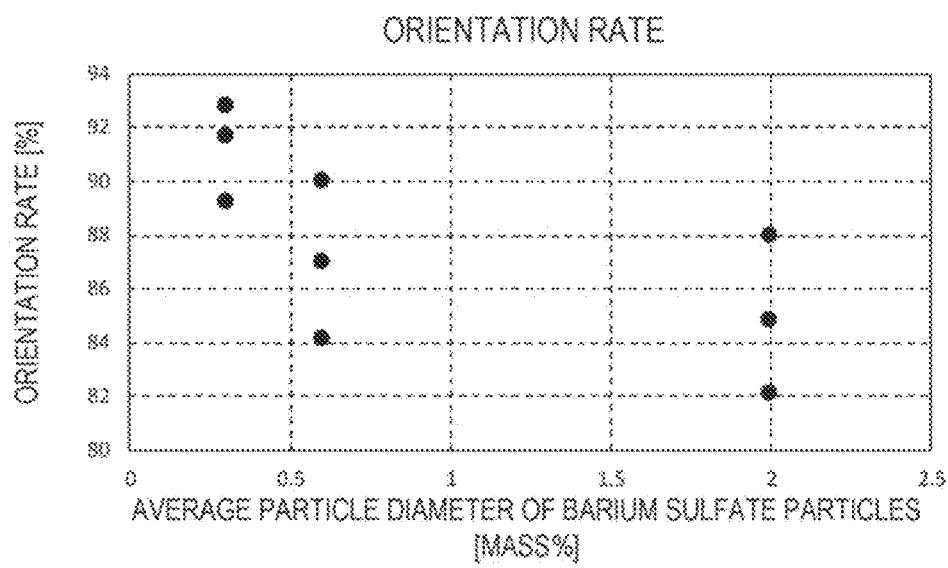
FIG. 10A to FIG. 10C are graphs of orientation rate.
Figure 10B:
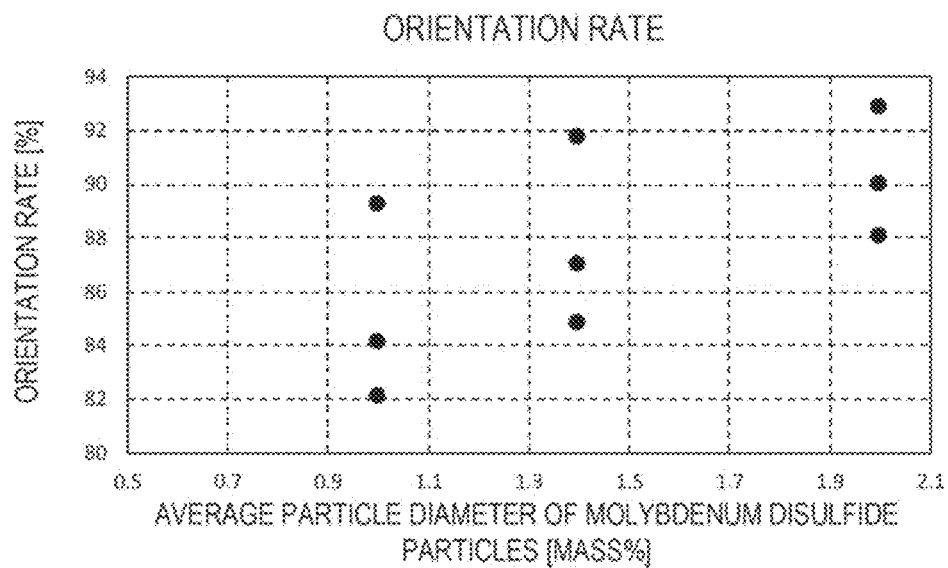
Figure 10C:
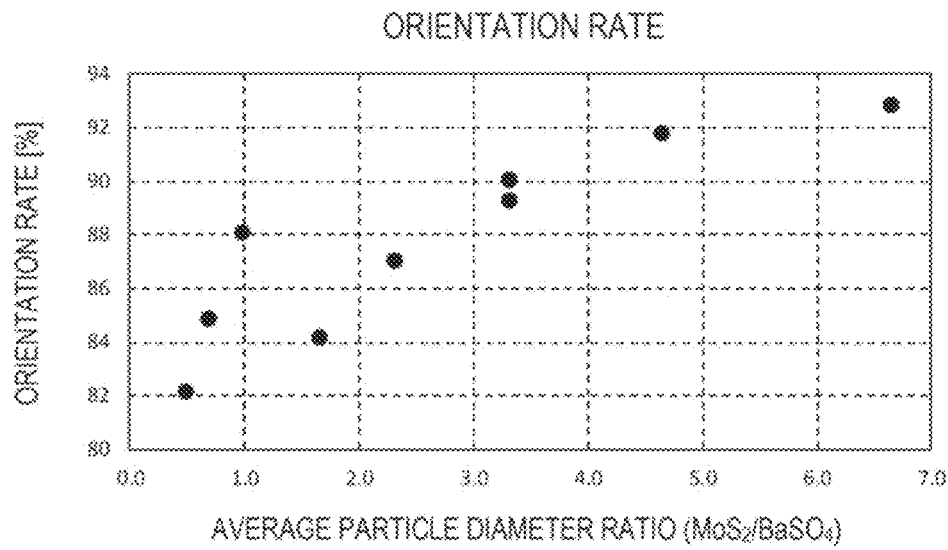

FIGS. 10A to 10C are graphs showing the relationship between the orientation rate and each of the average particle diameter of the molybdenum disulfide particles 12b and the average particle diameter of the barium sulfate particles 12c. The vertical axis of FIGS. 10A to 10C shows the orientation rate. The orientation rate is an index showing the level of parallelism of the layer direction of the molybdenum disulfide particles 12b with respect to the sliding surface. The horizontal axis of FIG. 10A shows the average particle diameter of the barium sulfate particles 12c, the horizontal axis of FIG. 10B shows the average particle diameter of the molybdenum disulfide particles 12b, and the horizontal axis of FIG. 10C shows the average particle diameter ratio.

As shown in FIG. 10B, it has been found that the larger the average particle diameter of the molybdenum disulfide particles 12b, the higher the orientation rate. This is considered to be because, as the average particle diameter of the molybdenum disulfide particles 12b increases, the degree of freedom of rotation of the molybdenum disulfide particles 12b during application decreases, and the molybdenum disulfide particles 12b tend to be oriented so that the layer direction is parallel to the sliding surface.

As shown in FIG. 10A, it has been found that the smaller the average particle diameter of the barium sulfate particles 12c, the higher the orientation rate. This is considered to be because, as the average particle diameter of the barium sulfate particles 12c decreases, the possibility can be reduced that the barium sulfate particles 12c will prevent the molybdenum disulfide particles 12b from being oriented so that the layer direction is parallel to the sliding surface. As shown in FIG. 10C, there is a strong first-order correlation between the average particle diameter ratio and the orientation rate.

seizure surface pressure with scratches. However, the seizure surface pressure without scratches increases as the content of the molybdenum disulfide particles 12b increases. This demonstrates that not the molybdenum disulfide particles 12b, but the barium sulfate particles 12c are transferred to the counter material to greatly contribute to the prevention of seizure.

TABLE 2

|  | $BaSO_4$ content [volume %] | $MoS_2$ content [volume %] | $MoS_2$ + $BaSO_4$ content [volume %] | Content ratio ($BaSO_4$/ $MoS_2$) | Seizure surface pressure [MPa] | Seizure surface pressure with scratches [MPa] |
| --- | --- | --- | --- | --- | --- | --- |
| Sample 11 | 15 | 25 | 40 | 0.60 | 81 | 71 |
| Sample 12 | 16 | 28 | 44 | 0.57 | 96 | 81 |
| Sample 13 | 16 | 32 | 48 | 0.50 | 105 | 71 |
| Sample 14 | 15 | 30 | 45 | 0.50 | 92 | 75 |
| Sample 15 | 10 | 35 | 45 | 0.29 | 81 | 57 |
| Sample 16 | 14 | 28 | 42 | 0.50 | 79 | 71 |
| Sample 17 | 0 | 40 | 40 | 0.00 | 85 | 49 |
| Sample 18 | 10 | 30 | 40 | 0.33 | 90 | 65 |
| Sample 19 | 20 | 25 | 45 | 0.80 | 79 | 67 |
| Sample 20 | 20 | 20 | 40 | 1.00 | 65 | 55 |

Table 2 shows the results of measuring the seizure surface pressure for Samples 11 to 20. The method for measurement of each seizure surface pressure for Samples 11 to 20 is the same as the methods for measurement of various measured values in the first embodiment. However, both the seizure surface pressure (seizure surface pressure with scratches) obtained when the test was conducted using the same scratched sliding member 1 as in the first embodiment and the seizure surface pressure obtained when the test was conducted using a non-scratched sliding member 1 were measured.

Figure 11A:
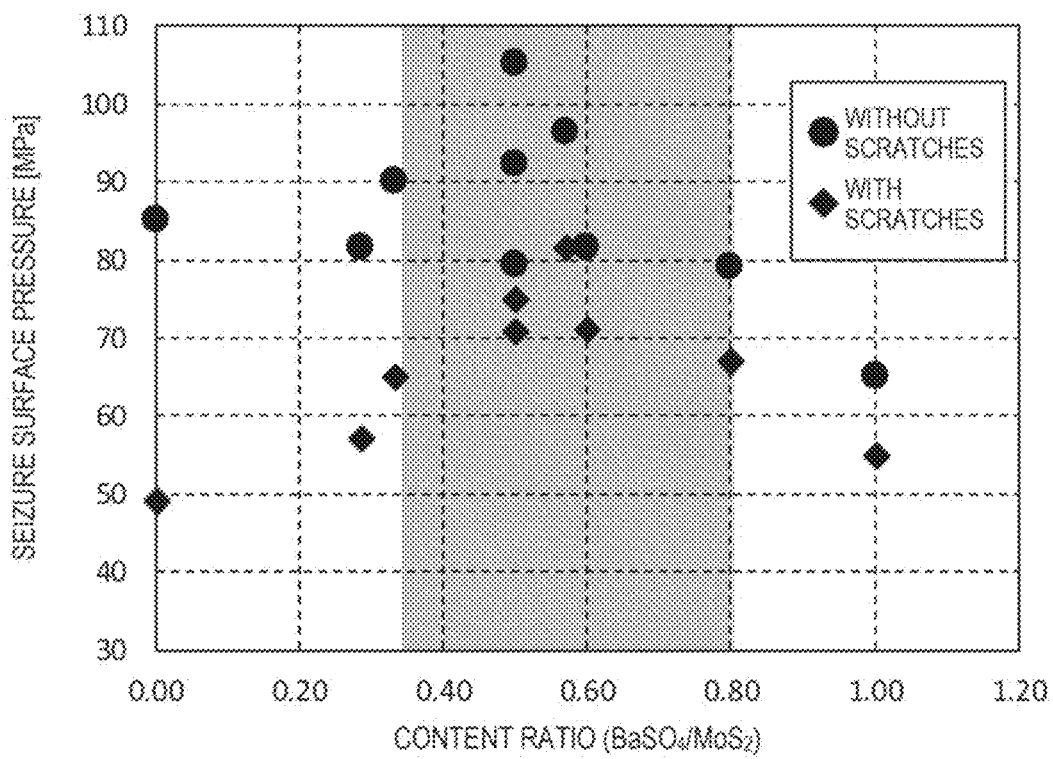
FIGS. 11A and 11B are graphs of seizure surface pressure.
Figure 11B:
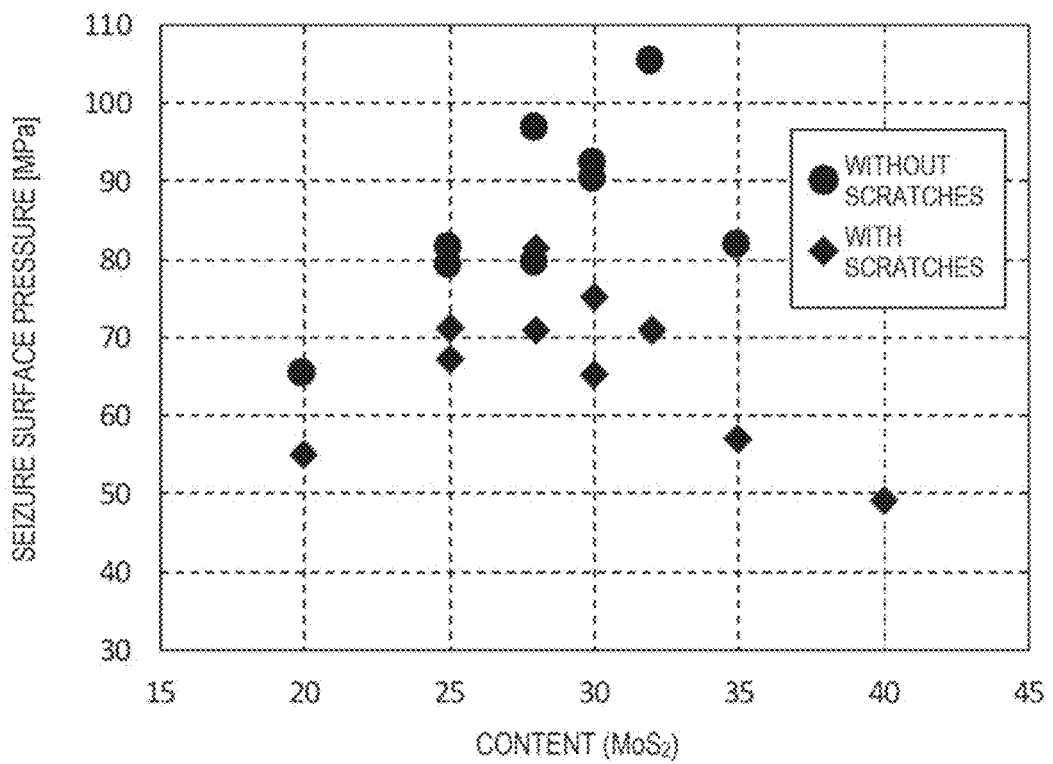

FIG. 11A is a graph showing the relationship between the seizure surface pressure and the content ratio of the barium sulfate particles 12c to the molybdenum disulfide particles 12b. FIG. 11B is a graph showing the relationship between the seizure surface pressure and the content of the molybdenum disulfide particles 12b. The vertical axis of FIGS. 11A and 11B shows the seizure surface pressure. The horizontal axis of FIG. 11A shows the content ratio of the barium sulfate particles 12c to of the molybdenum disulfide particles 12b, and the horizontal axis of FIG. 11B shows the content of the molybdenum disulfide particles 12b. The content ratio is a ratio obtained by dividing the content of the barium sulfate particles 12c by the molybdenum disulfide particles 12b.

As shown in FIG. 11A, there is a correlation that can be expressed by an upwardly convex function between the content ratio and the seizure surface pressure. As shown in gray in FIG. 11A, it has been found that a good seizure surface pressure can be obtained by setting the content ratio to 0.35 to 0.8. That is, it has been found that a good seizure surface pressure can be obtained by setting the total volume of the barium sulfate particles 12c to 0.35 times or more and 0.8 times or less the total volume of the molybdenum disulfide particles 12b. This is considered to be because the barium sulfate particles contained in the resin coating layer are easily transferred to the counter material by setting the content ratio to 0.35 to 0.8.

As shown in FIG. 11B, there is a correlation that can be expressed by an upwardly convex function between the content of the molybdenum disulfide particles 12b and the (4) Other Embodiments In the above embodiment, the sliding member 1 constituting the sliding bearing A for bearing the crankshaft of an engine has been illustrated, but a sliding bearing A for another purpose may be formed by the sliding member 1 of the present invention. For example, a radial bearing such as a transmission gear bush or a piston pin bush/boss bush may be formed by the sliding member 1 of the present invention. Furthermore, the sliding member of the present invention may be used in thrust bearings, various washers, or swash plates for car air-conditioner compressors. Further, the number of application layers may be 3 or more.

REFERENCE SIGNS LIST

1 Sliding member
2 Counter material
10 Back metal
11 Lining
12 Overlay
12a Binder resin
12b Molybdenum disulfide particles
12c Barium sulfate particles
100 Ball-on-plate tester
110 Ball
A Bearing
L1 Outermost layer
L2 Inner layer
S Sample

The invention claimed is:
1. A sliding member comprising a base layer and a resin coating layer formed on the base layer,
   wherein the resin coating layer consisting essentially of
   a polyamide-imide resin as a binder,
   barium sulfate particles having an average particle diameter of 0.6 µm, and
   molybdenum disulfide particles having an average particle diameter which is 1.67 times or more and 2.8 times or less than an average particle diameter of the barium sulfate particles;

wherein the resin coating layer is a sliding surface that is configured to slide with respect to a counter material;

wherein, in the content of the resin coating layer other than unavoidable impurities, the barium sulfate particles have a volume ratio of 0.14 to 0.2, the molybdenum disulfide particles have a volume ratio of 0.25 to 0.32, and the remainder is polyamide-imide resin; and wherein the content ratio of barium sulfate particles to molybdenum disulfide particles is 0.35 to 0.8 by volume.

2. The sliding member according to claim 1, wherein the molybdenum disulfide particles have the average particle diameter which is 1.7 times or more and 2.8 times or less than the average particle diameter of the barium sulfate particles.

* * * * *